US005354193A

United States Patent [19]

Kupcikevicius

[11] Patent Number: 5,354,193

[45] Date of Patent: Oct. 11, 1994

[54] APPARATUS FOR MAKING A FOOD CONTAINING PACKAGE WITH INTEGRAL HANDLE

[75] Inventor: Vytautas Kupcikevicius, Oaklawn, Ill.

[73] Assignee: Viskase Corporation, Chicago, Ill.

[21] Appl. No.: 112,524

[22] Filed: Aug. 27, 1993

Related U.S. Application Data

[62] Division of Ser. No. 882,730, May 14, 1992, Pat. No. 5,286,503.

[51] Int. Cl.5 ...................... B29C 51/42; B65D 67/00; B65B 53/00

[52] U.S. Cl. .................................. 425/403; 425/577; 53/134.1; 53/557

[58] Field of Search ............... 425/393, 403, 383, 470, 425/577, 384; 264/230, 342 R; 53/442, 413, 557, 134.1; 156/85, 86

[56] References Cited

U.S. PATENT DOCUMENTS 3,190,050 12/1960 Kirkpatrick .......................... 53/442
3,237,243 11/1961 Saumsiegle et al. ................ 425/393
3,479,789 11/1969 Harrison .............................. 53/557
3,732,661 5/1973 Cooldberger et al. ............ 53/134.1
4,032,281 6/1977 Rakovsky ............................ 425/393
4,247,005 1/1981 Buxton ................................ 53/134.1
4,429,510 2/1984 Thimon ................................ 53/557
4,555,025 11/1985 Weinberg et al. .................. 206/497
4,764,028 8/1988 Wood et al. .......................... 383/20
5,050,368 9/1991 Noh ...................................... 53/442
5,120,553 6/1992 Kupcikevicius .................... 426/129

FOREIGN PATENT DOCUMENTS 2544787 4/1977 Fed. Rep. of Germany .
311026 12/1970 Sweden .

*Primary Examiner*—Khanh Nguyen
*Attorney, Agent, or Firm*—Roger Aceto

[57] ABSTRACT

A food product package includes a bulky food product hermetically sealed in a bag of heat shrunk film. The package has an integral self-supporting handle which is formed from plies of the film and which extends out from an end of the package in a conventional handle shape. The handle is formed by causing a skirt portion of the bag to heat shrink about a rigid member positioned to maintain the skirt portion spaced from an end of the package during shrinking.

5 Claims, 6 Drawing Sheets

APPARATUS FOR MAKING A FOOD CONTAINING PACKAGE WITH INTEGRAL HANDLE

This application is a division of prior U.S. application Ser. No. 08/882,730 May 14, 1992, now U.S. Pat. No, 5,286,503.

FIELD OF THE INVENTION

The present invention relates generally to a food containing shrink bag package and more specifically to such a shrink bag package having an integral carrying handle and to a method and apparatus for forming the food package.

BACKGROUND OF THE INVENTION

It is customary for food processors to vacuum package bulky food articles such as whole muscle meat products, brick cheese and poultry in shrink bags. The processor loads the food article into the bag and evacuates the bag to collapse it about the food product. The bag is sealed, while in its evacuated condition, by gathering the open end and applying a metal clip or by heat sealing. The sealed bag then is passed through a hot water bath or hot air tunnel to shrink the sealed bag about the food product. Shrinking the bag in this fashion closely conforms the bag to the contour of the food product thereby making an attractive, generally wrinkle-free package.

One problem related to a shrink bag package containing a turkey or other large food items is that the resulting food package is bulky, relatively heavy, possibly frozen, and difficult to manually grasp and lift. Therefore it is desirable to provide a carrying handle to facilitate handling the food product package. For this purpose a separate handle is attached to the package at the clip closure or the package is inserted into a netting which is gathered and clipped to provide a carrying handle. Both arrangements add to the packaging costs.

Preferably, the handle should be formed integral with the shrink bag to avoid the added expense and processing steps of attaching a handle to the food product package. For poultry packaging, a handle located at the tail of the bird is preferred as this leaves the area of the package over the breast area of the bird free to receive printed information such as a decorative design, corporate logo or other identifying product information. Also, a handle at the tail of the bird provides a desirable weight distribution in that the heavier breast portion of the bird is carried below the lighter tail portion.

U.S. Pat. No. 4,555,025 discloses a shrink bag package having an integral handle. The bag package is formed of a so called "extended lip bag" wherein one bag panel extends beyond the open bag end. The handle is formed in the extended lip portion by punching a hot die through the lip to provide an opening having a fused bead extending continuously about the opening. Upon heat shrinking to form the bag package, the extended lip portion of the bag undergoes an unrestrained free-shrink so it thickens and forms a handle which protrudes longitudinally from the resulting package.

One disadvantage of the resulting package as disclosed by U.S. Pat. No. 4,555,025 is that only a single ply of heat shrunk film supports the entire weight of the bag package. Also, there is no defined, predetermined form to the handle because it is formed totally by free-shrink of the film.

Co-pending U.S. patent application Ser. No. 07/577,702 now U.S. Pat. No. 5,120,553 discloses a shrinkable bag wherein the integral handle forming portion is located adjacent a preclosed end of the bag. This arrangement allows formation of a bag package wherein a double ply of the shrunk film supports the weight of the bag package so the handle is less likely to tear under the weight of the bag package.

While a shrink bag as disclosed in U.S. patent provides an acceptable application Ser. No. 07/577,702 now U.S. Pat. No. 5,120,553 bag package having an integral handle, further improvements are desirable to enhance the bag package for retail sale. For example, in general, handles formed by heat shrinking plastic film tend not to have a distinct and well defined handle-shape appearance. Heat shrinking to form the handle as disclosed in Ser. No. 07/577,702 now U.S. Pat. No. 5,120,553 draws the handle forming portion tight against the bag package so the handle is not a prominent and recognizable feature of the bag package and may be inconvenient for grasping and lifting the bag package.

Accordingly, an object of the present invention is to provide an apparatus for making a shrink bag package having an integral handle which is formed of shrink film material and which is a prominent and well defined feature of the bag.

Another object is to provide an apparatus for making a shrink bag package having an integral self-supporting handle portion formed of shrink film material.

Yet another object of the present invention is to provide a shrink bag package having a prominent, well defined handle portion integral an end of the package and formed of shrink film material, including a self-supporting hand grip which is spaced out from the bag package and is turned so as to present a flat gripping surface and is connected to the package by a double ply of shrink film material.

A still further object of the present invention is to provide apparatus for forming a prominent, well defined handle at one end of a shrink bag package.

SUMMARY OF THE INVENTION

A food product package for purposes of the present invention utilizes a bag made of a heat shrinkable film and has a handle forming portion located at the preclosed end of the bag. A suitable bag arrangement for use in the present invention is disclosed in U.S. patent application Ser. No. 07/577,702 now U.S. Pat. No. 5,120,553.

The shrink bag as disclosed in Ser. No. 07/577,702 now U.S. Pat. No. 5,120,553 preferably is made from tubular stock and, in a flattened condition, the front and rear of the bag are congruent panels which lay flat one against the other. The bag has a preclosed end formed by heat sealing the panels together. A skirt portion extending from this heat seal contains a slit which forms a handle opening.

A bulky food item is loaded into the bag, the bag is evacuated and then sealed to hermetically encase the food product, and then the food containing bag is heated. Heating causes the bag to shrink and tighten about the food item to form a food product package. The portion of the skirt defined by the slit also shrinks and forms a handle for carrying the food product package.

While the food product package may contain any one of a variety of bulky food items, the package preferably is for whole body birds such as fresh or frozen turkeys.

The food product package for purposes of the present invention has an integral handle portion which is a defined, self-supporting structure extending out from one end of the package to provide an instantly recognizable, easily graspable handle structure. The handle is composed of at least one ply, and preferably two plies of the heat shrunk film and is formed to handle-shape during shrinking by controlling and restricting the free shrink of the film.

Accordingly, the present invention is characterized in one aspect thereof by an apparatus for forming food package comprising a food product encased between plies of a heat shrunk film and a self-supporting handle integral a first end of the package. The handle is composed of at least one ply of the heat shrunk film and is disposed in a plane extending longitudinally outward from the package first end. The handle includes a hand grip defined by a strip of the heat shrunk film spaced outwardly from said first end and oriented generally perpendicular to the longitudinally extending plane so as to present a substantially flat, hand gripable surface.

In yet another aspect, the present invention is an apparatus for forming a food package having an integral handle characterized by:

a) a movable support for receiving a food containing package including a food product encased in a heat shrinkable film and the package having a limp skirt at one end composed of the heat shrinkable film and the skirt having an opening therethrough;

b) a rigid handle-shaping member upstanding from the movable support, the member being adapted to extend through the skirt opening so a skirt section is disposed about the member;

c) means for moving the support through a shrink zone; and d) heating means in the shrink zone for heating and shrinking the film encasing the food product and drawing the skirt section tight about said handle-shaping member.

DETAILED DESCRIPTION OF THE INVENTION

Figure 1:
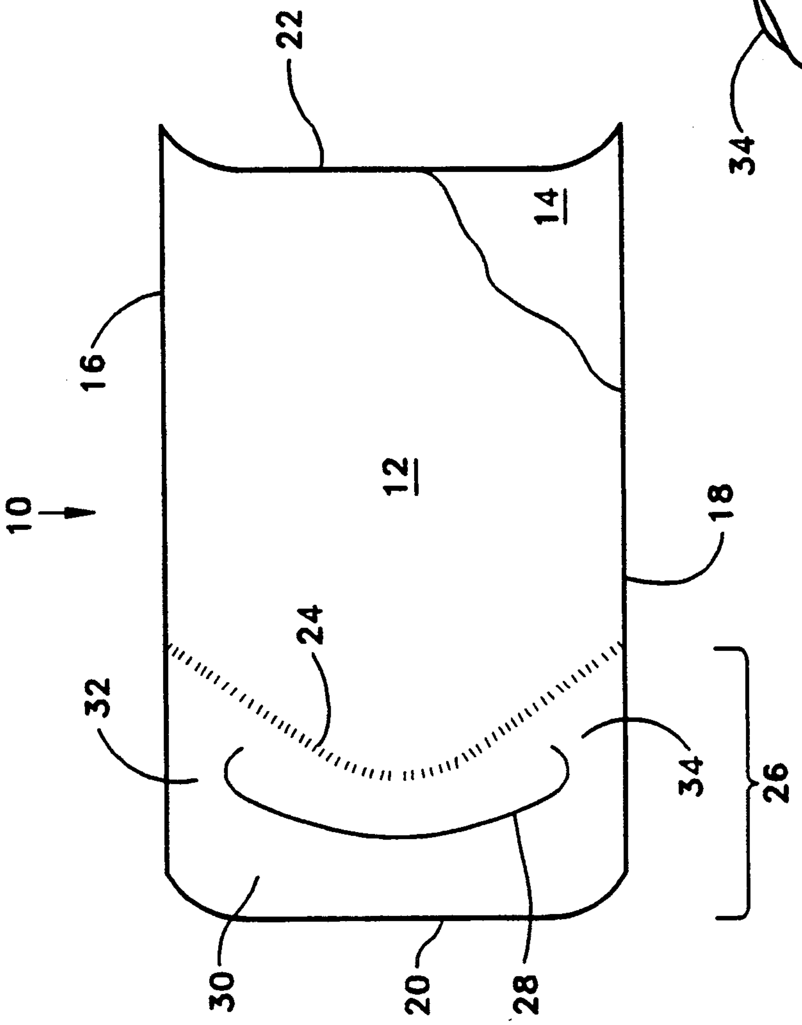
FIG. 1 is a plan view showing an unfilled shrink bag as may be used to manufacture a food containing package according to the present invention.

Referring to the drawings, FIG. 1 shows a shrink bag as may be used for the present invention generally indicated at 10 in its lay-flat condition prior to its packaging use. The bag itself is described in more detail in U.S. Ser. No. 07/577,702 now U.S. Pat. No. 5,120,553 the disclosure of which is incorporated herein by reference. The bag is made of any suitable heat shrinkable thermoplastic packaging film commonly used for vacuum packaging food products. A suitable film is an oriented heat shrinkable film as disclosed for example in U.S. Pat. No. 4,863,769.

Generally, such films are formed as blown tubes. The tube is collapsed to a lay-flat condition to provide superimposed front and rear bag panels having seamless side edges. The laid-flat tube is then heat-sealed across its width to form a closed bag end and then it is severed at a location spaced from the heat seal to provide an open bag end.

In accordance with this practice, FIG. 1 shows the bag 10 to have superimposed front and rear panels 12 and 14 respectively. The front and rear panels are congruent and lay flat one against the other.

The panels are joined along lateral side edges 16, 18. If the bag is made of a collapsed tube as noted above, the side edges 16, 18 are seamless but are recognized when the bag is open by a longitudinal crease. Otherwise one or both side edges 16, 18 contain a seam such as is formed by heat sealing or an adhesive for connecting the panels.

The congruent bag panels 12, 14 have common ends 20 and 22 wherein end 20 is a lower end and end 22 is the open upper end of the bag. A heat seal 24 extends across the bag inboard of the lower end 20 and this heat seal defines the preclosed bottom end of the bag.

The portion of the bag panels 12, 14 between heat seal 24 and lower end 20 defines a skirt 26 at the lower end of the bag opposite open end 22. The skirt contains a slit 28 which forms an opening to facilitate use of the skirt to form a bag handle for carrying an article sealed within the bag.

In this respect the opening formed by slit 28 separates a section 30 of the skirt from the preclosed bottom end 24 of the bag and defines two transversely spaced side portions 32,34. These side portions allow skirt section 30 to remain attached to the bag.

As shown in FIG. 1, skirt 26 is composed of superimposed portions of the front and rear panels 12, 14 so the entire skirt is two plies thick.

Figure 2:
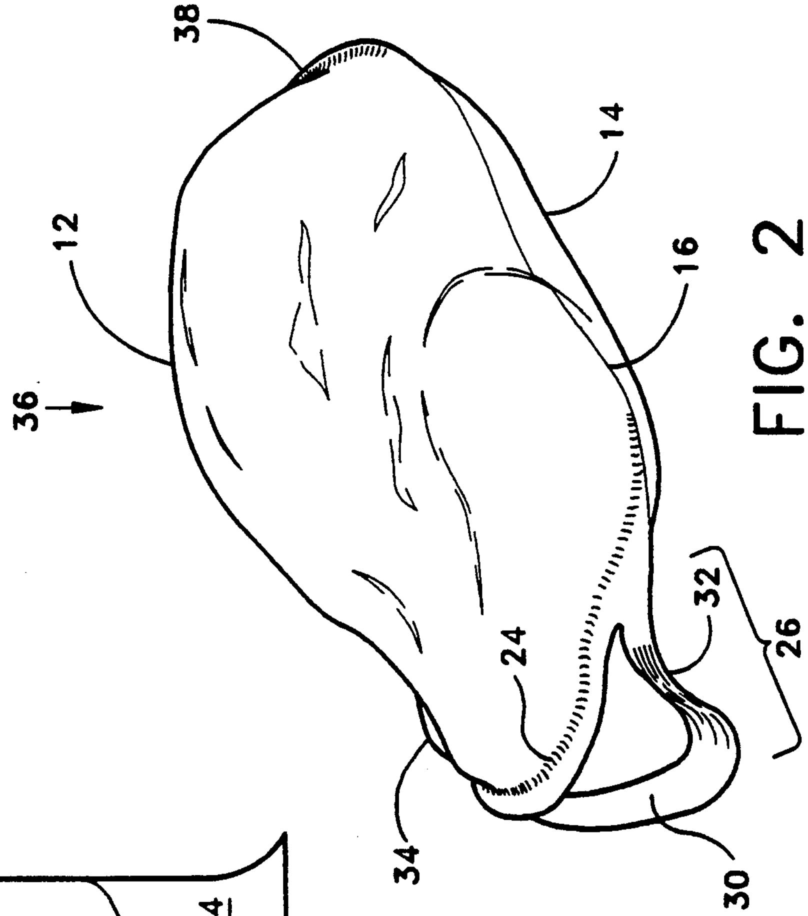
FIG. 2 is a perspective view showing a food containing package in a pre-shrunk condition.

FIG. 2 shows a food package generally indicated at 36 formed using the bag of FIG. 1. To this end, a bird such as a turkey or the like is loaded into the bag of FIG. 1 through its open end 22. Next the bag is evacuated and the open end of the bag is closed. To close the bag, the open end 22 is stretched to a flat width and is sealed, preferably by a heat seal 38.

As an alternative, the open bag end 22, after evacuation, is gathered and closed by a metal clip (not shown). In either case the food product is hermetically sealed within the bag by encasing between plies (i.e. front and rear panels 12, 14) of the heat shrinkable film wherein preclosed bag end 24 and heat seal 38 now define opposite ends of the food package. The operations of evacuating, heat sealing (or clipping) are all conventional operations and suitable vacuum packaging apparatus for performing these operations are commercially available.

Evacuation causes the bag panels 12, 14 to collapse down about the food product in the bag. However, as shown in FIG. 2 the bag material is wrinkled and a longitudinal crease representing a side edge 16, 18 is clearly visible. Also, the skirt 26 which extends longitudinally from the food package preclosed end 24 is limp so the skirt section 30 sags and droops away from the package under its own weight.

Figure 3:
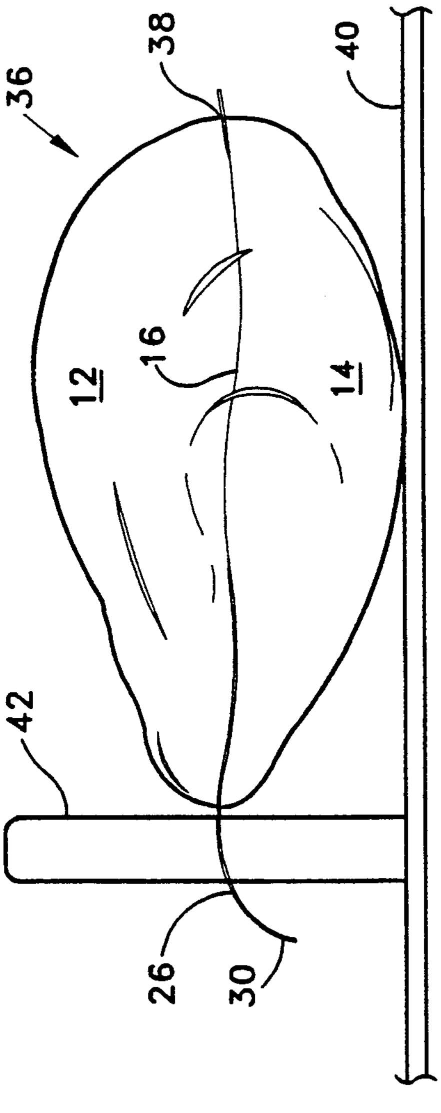
FIGS. 3 and 4 are side elevation views illustrating successive steps in the method of the present invention.

FIG. 3 shows the package 36 of FIG. 2 positioned on a support 40 for transporting the package through a heated zone (not shown) to heat shrink the bag. Support 40 may be any suitable means such as a driven conveyor or the like movable along a path of travel including a loading zone where a package 36 is deposited onto the support, a heating zone where heat is applied to shrink the film, and an unloading zone where packages are removed from the support.

Figure 5:
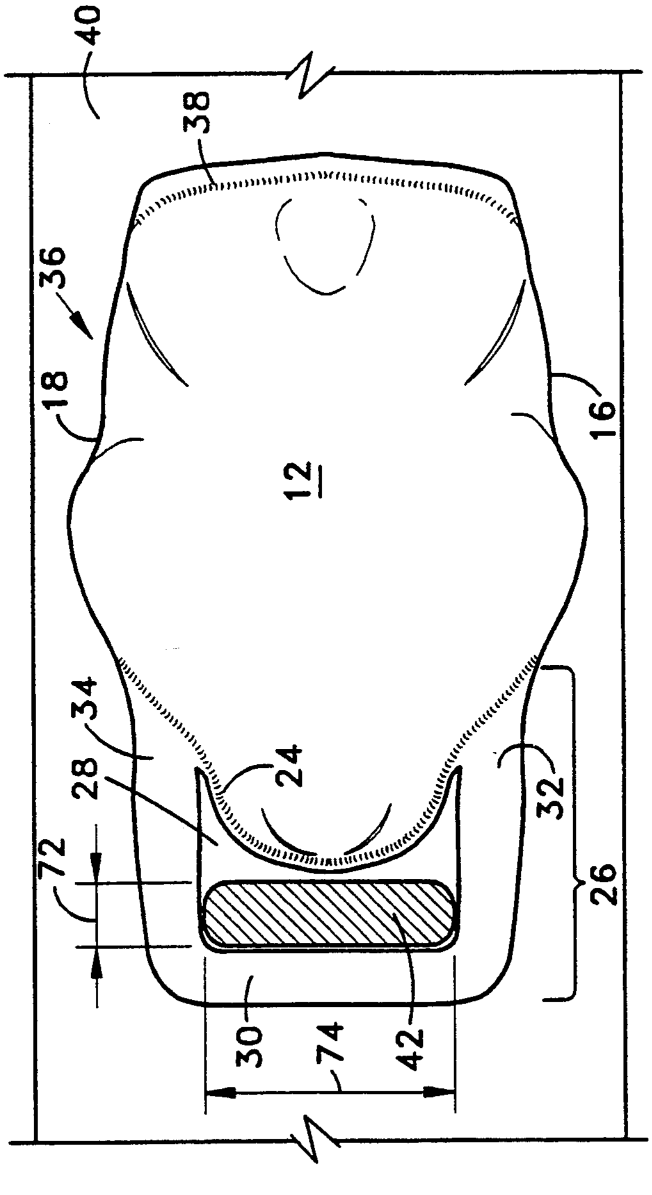
FIGS. 5 and 6 are plan views of FIGS. 3 and 4 respectively.

As shown in FIG. 3, there is a rigid handle-shaping member 42 which upstands from support 40. In the course of depositing package 36 on to the support, skirt 26 is arranged so skirt section 30 and side portions 32, 34 are positioned about handle-shaping member 42. As best seen in FIG. 5, the rigid member 42 is positioned in the opening defined by slit 28 and is interposed between the food package preclosed end 24 and limp skirt section 30.

Figure 4:
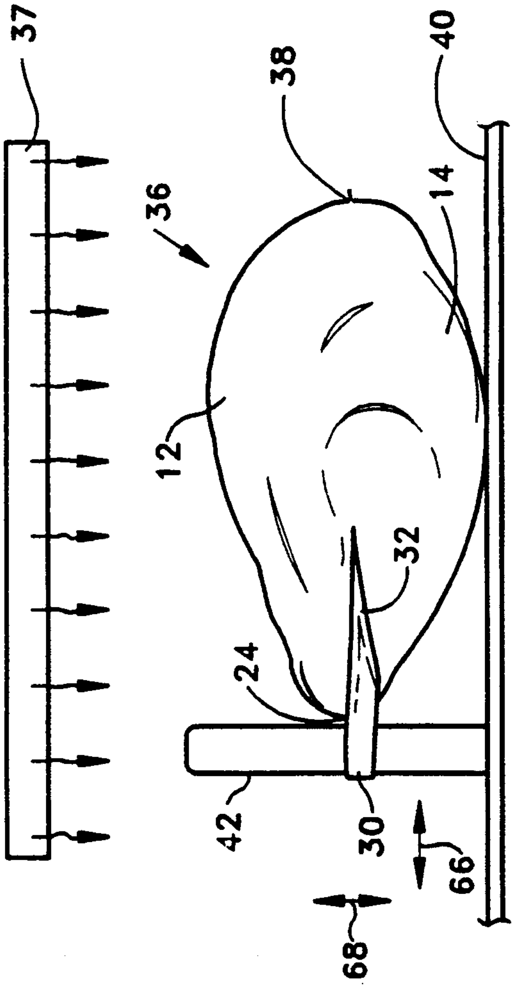

The support 40 (hereafter referred to as a "conveyor") then transports the package to a heating zone as shown in FIG. 4 where the bag is subject to heat for purposes of shrinking the plastic film. Heating may be accomplished by any suitable means 37 such as, for example, a hot air source, infra red lamps or steam, or by immersing the package 36 in hot water.

On heat shrinking, the bag material becomes tight to the food product to provide a smooth generally wrinkle-free package. In this respect, wrinkles or other stretch lines including the longitudinal creases of edges 16, 18 are eliminated as the bag material is drawn taught about the food product within the bag.

Figure 6:
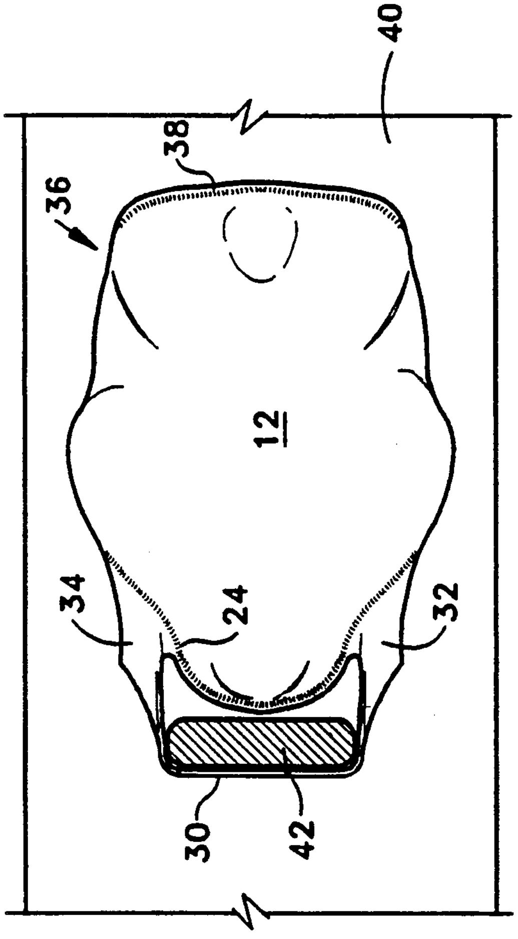

Also on heat shrinking, FIGS. 4 and 6 show that the two skirt side portions 32, 34 pull the skirt section 30 inward towards package end 24. However, the presence of rigid member 42 restrains the shrinkage of skirt portions 32, 34 so that while heating causes the portions to thicken, the total amount of longitudinal shrink is limited by member 42. At the same time, limp skirt section 30 which is disposed around the rigid member also thickens, shrinks and pulls tight around the rigid member. The tension caused by the shrinking of skirt portions 32, 34 causes the skirt section 30 to turn so the plies of film forming skirt section 30 lay flat against the rigid handle-forming member.

Conveyor 40 then moves the package 36 to an unloading zone (not shown). Movement from the heating zone allows cooling and on cooling, the skirt section 30 and portions 32, 34 take a set to the configuration shown in FIGS. 4 and 6.

At the unloading zone, the package is lifted from conveyor 40 and this removes the skirt from about rigid member 42. However, as a result of heat shrinking about the form of rigid member 42, the limp skirt now is stiffer and self-supporting and is formed to the handle-shape as shown in FIG. 7.

Figure 7:
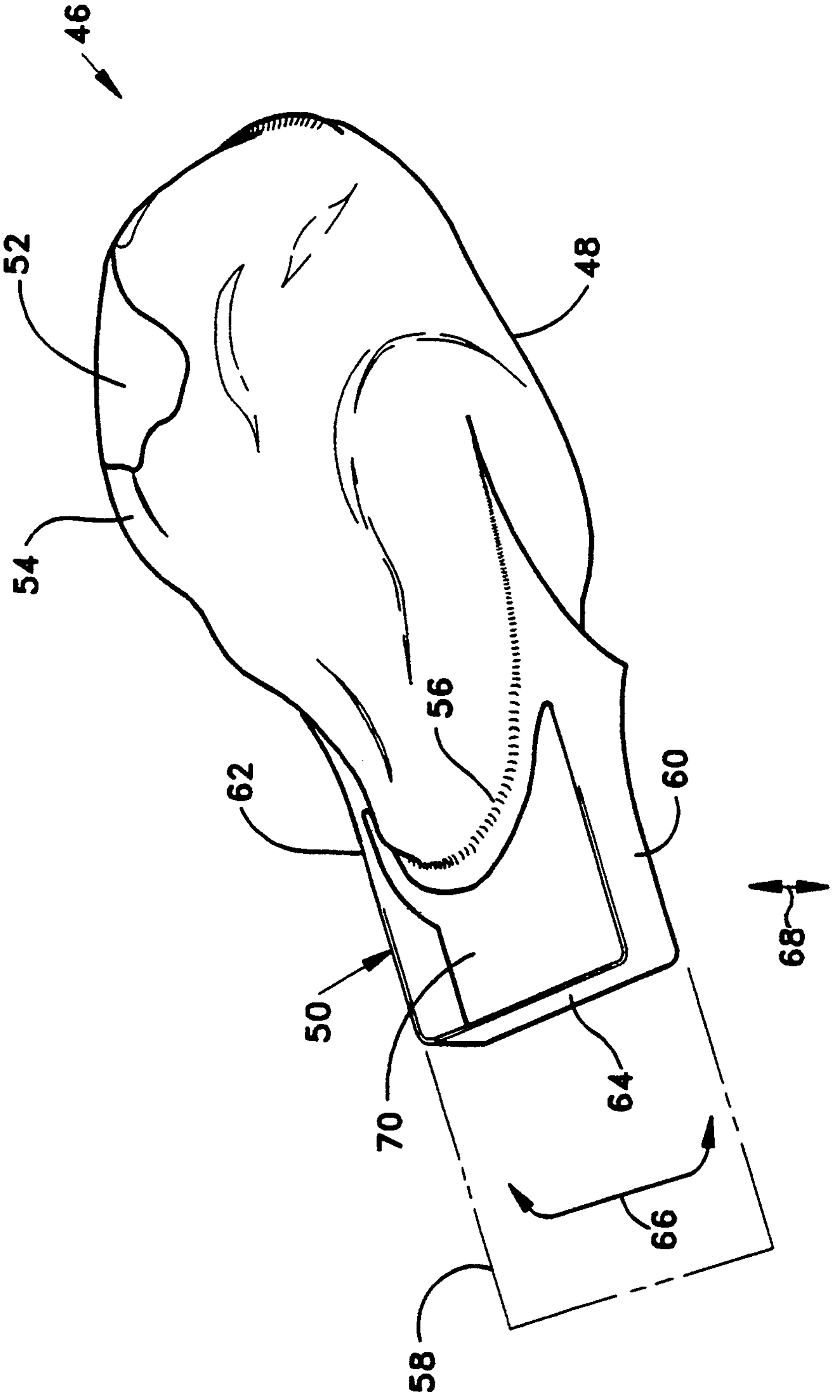
FIG. 7 is a perspective view illustrating a food containing package of the present invention.

FIG. 7 shows a food package of the present invention generally indicated at 46. This package includes a food-product containing portion 48 and an integral handle generally indicated at 50. The food-product containing portion includes a bulky food product 52 such as a turkey or the like hermetically encased in a heat shrunk film 54.

The handle 50 is self-supporting and extends outward from a first end 56 of the food-containing portion. This handle is formed of at least one ply of the heat shrunk film 54 encasing the food product and is disposed in a plane extending generally longitudinally outward from end 56 of the food-containing portion 46. Preferably this plane, as represented by phantom line 58, is close to a plane which longitudinally bisects the food-containing portion 48. Handle 50, as formed by restrained shrinkage about rigid member 42 (FIGS. 4 and 6), is a typical handle-shape in that it comprises two separate and spaced side elements 60, 62 which connect the opposite ends of a hand-grip 64 to transversly spaced locations of the food product containing portion 48. Moreover, the hand grip 64 is a strip turned and oriented in a plane perpendicular to the plane 58 so the strip offers a relatively wide load bearing surface for contacting the fingers of a person carrying the package by the handle portion.

As noted above, the heat shrinkable film of bag skirt 26 (FIG. 1) is formed to a handle-shape by inserting a rigid member 42 (FIG. 3) into the slit 28 so the shrinkage of the skirt portions 30, 32 and 34 in a longitudinal direction is restrained and the amount of shrinkage is controlled or restricted.

This controlled heat shrinking converts the limp skirt section 30 and skirt portions 32, 34 to the self-supporting handle portions 64 and 60, 62 respectively. With reference to FIG. 7 it can be appreciated that the controlled or restricted longitudinal shrinkage of the skirt film generally is within the plane 58 of the resulting handle 50, that is, the restricted shrink is generally in the direction indicated by arrow 66 in FIGS. 4 and 7. However, it also should be appreciated that rigid member 42 does not restrict shrinkage in the direction indicated by arrow 68 which is generally perpendicular plane 58. Thus, the shrinkage of skirt section 30 and portions 32, 34 are restricted or controlled in a longitudinal direction indicated by arrow 66, but they are free to shrink with little or no restriction in the vertical direction indicated by arrow 68. The result is that in relative terms there is less shrinkage of the skirt section 30 and portions 32, 34 in the longitudinal direction than in a vertical direction.

Accordingly, thickening of the handle 50 occurs as it sets in a handle shape and hand-grip 64 is maintained at a position spaced longitudinally outward from package end 56 to provide an accessible hand opening 70. Shrinking of film about rigid member 42 in the manner described forms the limp skirt 26 to a self-supporting, defined handle shape spaced outward from an end of the food containing package.

The defined shape of handle 50 is determined at least in part by the configuration and disposition of rigid member 42. For example, as shown in FIG. 5 the thickness 72 of the rigid member and its distance from the preclosed end 24 of the product containing package will determine the spacing of the hand grip portion 64 (FIG. 7) from the end 56 of the food containing portion of the package. Likewise, as shown in FIG. 5 the width 74 of the rigid member 42 will determine the spacing between the spaced side elements 60, 62 (FIG. 7) of the handle.

Figure 8:
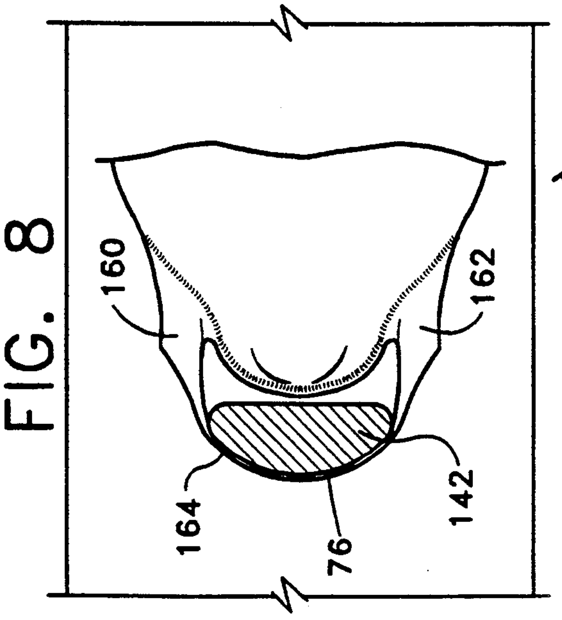
Figure 11:
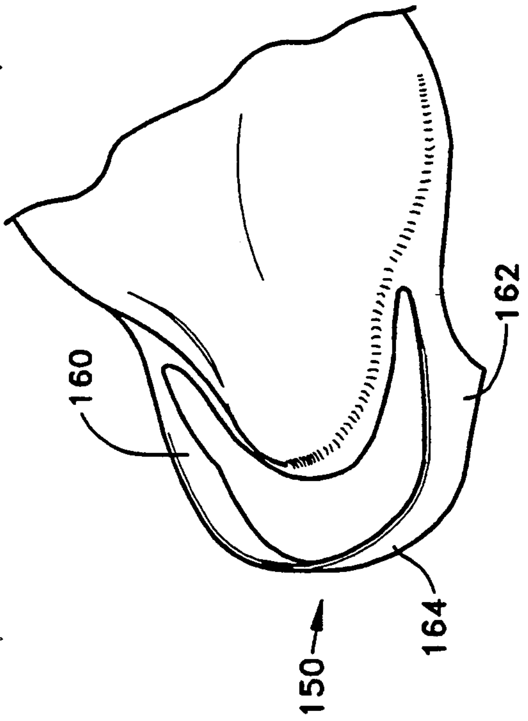

Since the shrink film, when it is heat shrunk, will conform to the shape of the restraining member and will take a permanent set when cooled, handle configurations other than as shown in FIGS. 4, 6 and 7 are possible. For example, in the embodiment shown in the plan view of FIG. 8, rigid handle-shaping member 142 has a convex or rounded surface 76 for shaping the limp skirt section 30 (FIGS. 3 and 5) looped about the rigid member. The result, on heat shrinking as shown in FIG. 11 is that the handle 150 has a more rounded appearance to match the profile of surface 76. In this regard the hand grip 164 is more of a smooth continuous curve having its opposite ends merging more or less tangentially with each of the two transversely spaced side elements 160, 162.

Figure 9:
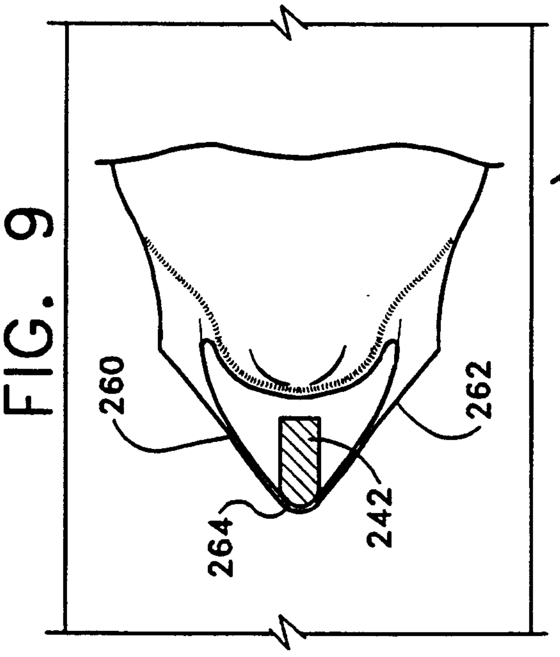
FIGS. 8, 9 and 10 are views similar to FIG. 6 only illustrating other embodiments of the invention.
Figure 12:
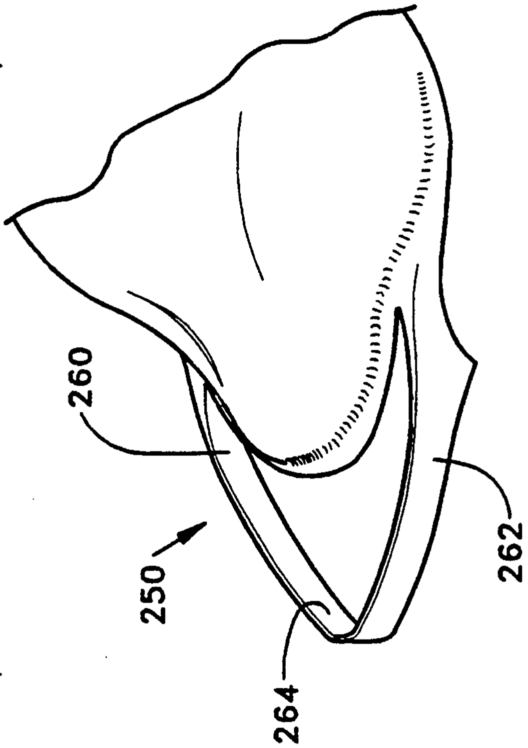
FIGS. 11 and 12 are views showing in perspective the handles formed using the method steps of FIGS. 8 and 9 respectively.

In FIG. 9, rigid handle-shaping member 242 is relatively narrow in plan view. The result, as shown in FIG. 12 are two elongated side elements 260, 262 joined at a common end 264 so the side elements themselves form the handle 250.

Figure 10:
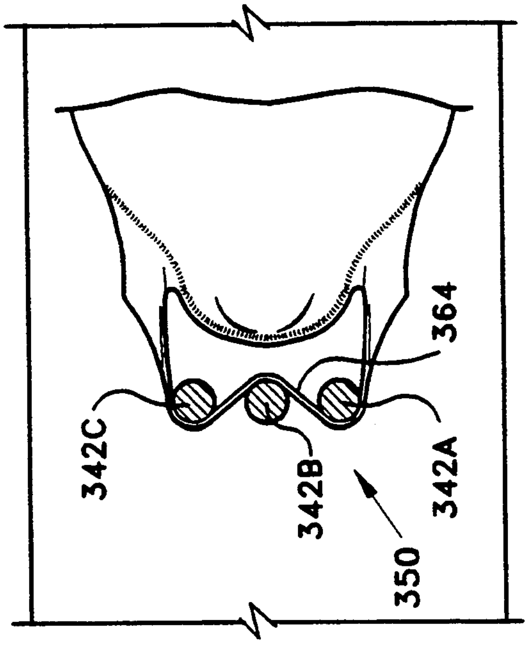

Still other configurations are possible by using a plurality of handle-shaping members. For example, as shown in FIG. 10 there are three rigid handle-shaping members 342, A, B, C. By draping the skirt section 30 of FIG. 2 so it laces between the three rigid members, it is possible to form a handle 350 having a hand grip 364 which is generally concave in plan view.

In each of the above described embodiments, the hand grip is a strip composed of film plies turned so the strip width is located generally perpendicular to the longitudinal plane of the handle.

Also, the strip forming the hand grip 64, 164, 264 and 364 is relatively flat in transverse cross section. However, this configuration also may be controlled as shown in FIG. 13.

Figure 13:
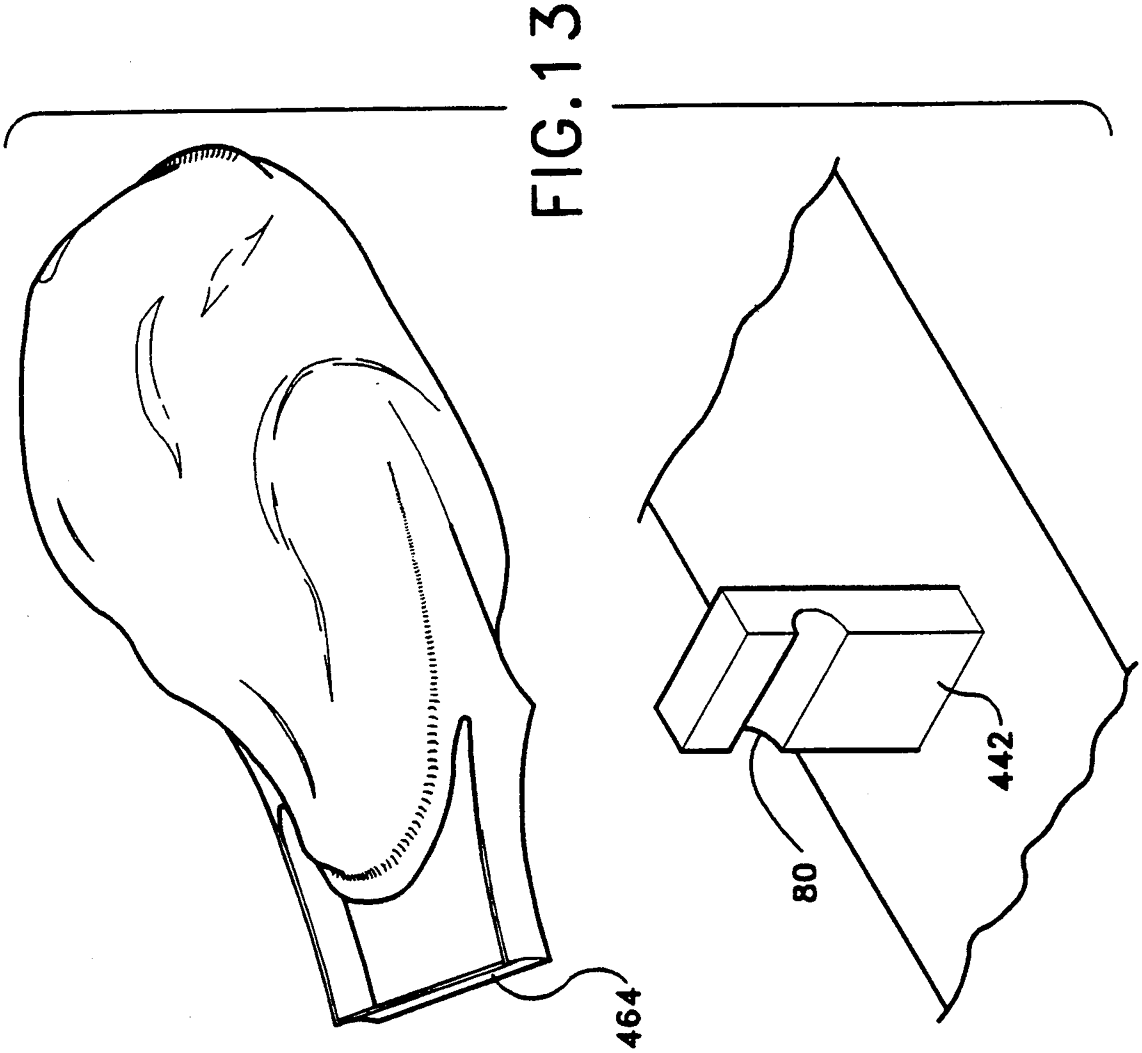
FIG. 13 is an expanded perspective view showing still another embodiment of the present invention.

FIG. 13 shows that the rigid handle-shaping member 442 has a shaped portion 80 which, in FIG. 13, is concave. During heat shrinking, the skirt section 30 (FIG. 2) draws against the rigid member and into the concave shaped portion 80. The result is that the strip forming hand grip 464 is concave in transverse cross section rather than flat. Thus this portion of the handle may be made either concave or convex depending upon the configuration of shaped portion 80.

In the embodiments as shown, the film initially was in the form of a bag 10 (FIG. 1), but other initial configurations can be used. For example, the food product can be inserted into a tube open at both ends wherein the encasing procedure includes sealing both ends and allowing sufficient skirt material at at least one end to provide a handle forming portion. As another alternative, the food product can be transported between sheets of the heat shrinkable film and the sheets heat sealed together around the periphery of the food product.

In any of these alternatives, including the use of a handle bag as disclosed in U.S. Pat. No. 4,555,025 the handle may be formed of a single ply of the bag material as opposed to the preferred use of a double ply.

It should be noted that the handle of the food product package of the present invention is self-supporting to the extent that on display it presents a stiff, prominent structure, easily identified as a handle and easily grasped due to the spacing it maintains from the food containing portion of the package. It also has a memory and will return to shape if not so over loaded that the forces involved impart a permanent film stretch to the handle. Overloading may occur, for example, if the food product is so hearty that carrying it by the handle will impart a permanent stretch.

Having described the invention in detail, what is claimed as new is:

1. Apparatus for forming a food package having an integral handle comprising:

a) a movable support for receiving a food containing package including a food product encased in a heat shrinkable film and the package having a limp skirt at one end composed of the heat shrinkable film and said skirt having an opening therethrough;

b) a rigid handle-shaping member upstanding from the movable support, the member being adapted to extend through said skirt opening so a skirt section is disposed about the member;

c) means for moving the support through a shrink zone; and d) heating means in the shrink zone for heating and shrinking the film encasing the food product and drawing the skirt section tight about said handle-shaping member.

2. Apparatus as in claim 1 wherein said handle-shaping member has a curved surface for shaping said skirt section to a curved configuration.

3. Apparatus as in claim 1 including a plurality of said rigid handle-shaping members upstanding from said support for shaping said skirt section.

4. Apparatus as in claim 1 wherein said rigid handle-shaping member has a surface disposed generally perpendicular to said movable support and said surface directly receiving a portion of said skirt section responsive to heat shrinking of said skirt section caused by said heating means.

5. Apparatus as in claim 1 wherein said skirt section is composed of transversely spaced side elements and a portion which extends between and connects said side elements and said rigid handle shaping member engages said portion of skirt section and maintains it spaced outwardly from an end of said package whereby said portion forms a handle grip responsive to heating by said heating means.

* * * * *